W. S. Carr.
Water Closet,
No. 82,595. Patented Sept. 29, 1868.
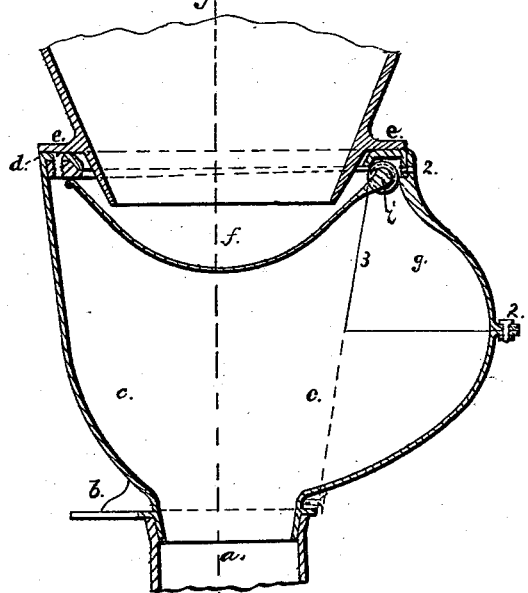
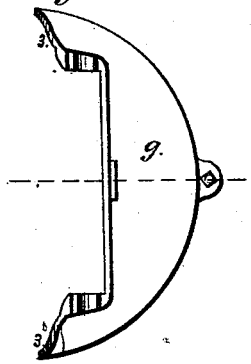
Witnesses:
Geo. D. Walker
Chas. H. Smith
Inventor:
Wm. S. Carr.

United States Patent Office.

WILLIAM S. CARR, OF NEW YORK, N. Y.

Letters Patent No. 82,595, dated September 29, 1868.

IMPROVEMENT IN WATER-CLOSETS.

*The Schedule referred to in these Letters Patent and making part of the same.*

TO ALL WHOM IT MAY CONCERN:

Be it known that I, WILLIAM S. CARR, of the city and State of New York, have invented, made, and applied to use a certain new and useful Improvement in Water-Closets; and I do hereby declare the following to be a full, clear, and exact description of the said invention, reference being had to the annexed drawing, making part of this specification, wherein—

Figure 1 is a vertical section of the closet-hopper, and

Figure 2 is a plan of the section that is removable from said hopper.

Similar marks of reference denote the same parts.

Heretofore it has been necessary to take off the basin of the water-closet, and generally the top plate of the hopper or container, in order to be able to remove the pan for putting in a new one, or for repairs. This involves the necessity of removing the wood-work of the seat, and taking off the basin and its connections, and frequently the putty or cement employed to make the joints tight is difficult to clean off to allow for packing it again. As the pan of the closet is the part most liable to get out of repair, there is frequently considerable expense incurred in getting at it, and sometimes injury results to the parts in their removal or replacement.

The nature of my said invention consists in a water-closet hopper or container, formed with a movable section at one side, through which the pan can be introduced or withdrawn without disturbing the basin, the container itself, or any of the pipes of the water-closet.

In the drawing—

$a$ is the soil-pipe; $b$, the base or foot of the container $c$, that is extended upwards from the base to the inward flange $d$, upon which the basin-flange $e$ rests, and is rendered tight by cement or putty.

The pan $f$ is mounted upon the spindle $i$, in any usual manner, and I provide an opening in the side of the hopper, below the flange $d$, sufficiently large for the introduction or removal of the said pan, without disturbing any of the other parts of the closet.

I have shown, in fig. 1, the section $g$ as being a segment of the hopper, separated by the vertical and horizontal joints 3 and 4, and attached in place by the screws 2 2 passing through ears on $g$; but said section might, however, be made larger, and extend down to the lower part of the container, as shown by red lines in fig. 1, and it will be apparent that this removable section may be of whatever shape desired, so as to provide for the introduction or removal of the pan of the closet.

The upper end of the section $g$ is shown in fig. 2 as containing the half bearings of the axle of the pan, so that said pan and axle are freed by the removal of the section $g$.

What I claim, and desire to secure by Letters Patent, is—

A water-closet hopper or container, formed at the upper end to receive the basin, and at the lower end to connect with the soil-pipe, and with a removable section, formed and located so that the swinging pan of the closet can be introduced or removed without necessarily removing the basin from said hopper, substantially as set forth.

In witness whereof, I have hereunto set my signature, this sixteenth day of March, 1868.

WM. S. CARR.

Witnesses:
CHAS. H. SMITH,
GEO. D. WALKER.